June 3, 1952 — N. GREENE — 2,599,446
RESILIENT WALLED SUPPLY CONTAINER WITH
CONNECTED MEASURING TRAP CHAMBER
Filed April 6, 1950

INVENTOR
NORMAN GREENE
BY
Davis, Hoxie & Faithfull
ATTORNEY

Patented June 3, 1952

2,599,446

UNITED STATES PATENT OFFICE 2,599,446

RESILIENT WALLED SUPPLY CONTAINER WITH CONNECTED MEASURING TRAP CHAMBER

Norman Greene, New York, N. Y.

Application April 6, 1950, Serial No. 154,321

2 Claims. (Cl. 222—205)

My invention relates to an improved flexible container having within its neck or upper section a reservoir for the storing and dispensing of desired quantities of a liquid.

An object of the invention is to provide a container having means to render liquids, such as drugs that must be topically applied, easily accessible to be dispensed in quantities as needed.

A further object is to provide a container with reservoir which will almost totally seal the container and will protect the body of liquid in the container from contamination, evaporation, accidental spilling or loss.

Figure 1:
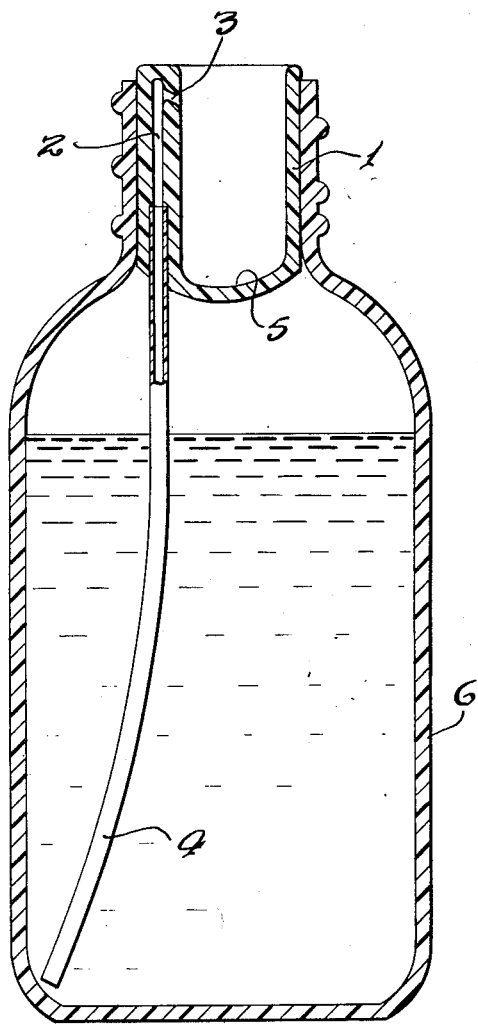
Figure 2:
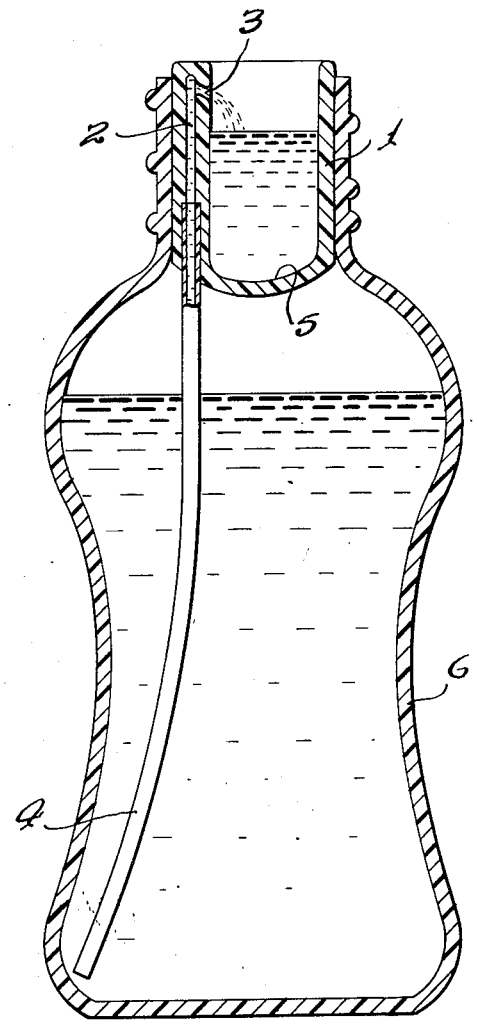

In the accompanying drawing, Fig. 1 is a vertical sectional view of a preferred form of my container, and Fig. 2 is a similar view showing the container when it has been squeezed.

The container has a main body 6 which must be made of flexible material. Examples of these materials are found in such plastics as polyethylene and in natural or synthetic rubbers. A dispensing reservoir 1 is sealed into the neck or upper part of the container. The reservoir may be made of the same material as the container body, or rigid materials may be used. The reservoir is so constructed that it will not prevent adding a conventional threaded cap. A tube 4 leads from the base of the container up into a channel 2 in the side of the reservoir. The channel extends to the upper part of the reservoir and opens through an orifice 3 directed downward toward the base 5 of the reservoir. The lower end of the tube should extend into the lowest edge or corner of the container in order that all of the liquid may be emptied.

For dispensing measured quantities of liquid or solutions, the inner walls of the reservoir may be graduated. The size of the orifice 3 and diameter of the tube 4 may be varied as required for liquids of different viscosities or for more rapid dispensation when greater quantities of liquid are desired. The shape and size of the reservoir may be designed or modified as needed.

Liquids are dispensed into the reservoir by squeezing the walls of the container. This increases the pressure in the container and forces the fluid through the tube 4, channel 2 and orifice 3 into the reservoir.

The simplicity of its construction and its wide adaptability render my invention available for a large number of uses. Examples of such uses include a dispensing medium for topically applied drugs, such as iodine and mercurochrome, where a cotton swab may be dipped into the solution in the reservoir, minimizing the possibility of contaminating the liquid in the container. It is readily seen that the construction of my reservoir and container will hold evaporation and spillage losses of the main body of fluid in the container at a minimum. Moreover, when the orifice is small the liquids from the container will not be ejected except when pressure is applied to the container. On account of the pressure at the orifice, the reservoir may be easily rinsed without contaminating the liquid in the container. The reservoir may be graduated so that measured quantities of liquid may be dispensed. It is evident that the graduated design will be useful for medicinal purposes where prescriptive dosages are important. Further examples of its uses include the use as a dispenser for ink, or such uses as the direct application of eye-wash.

It will be understood that more than one tube 4 may be arranged in the body 6 to conduct liquid into reservoir 1 by squeezing the body 6. In the following claims, the expression "tube means" is intended to denote one or more tubes leading to the reservoir 1 from the base of the container by way of side channel means 2. The base 5 of the reservoir constitutes a means for closing the reservoir from the interior of the container except through the tube means 4 leading to the base of the container.

I claim:

1. In a container having flexible side walls and having a neck, the combination of a reservoir fitted in the neck of the container and having side channel means and a top opening, tube means extending from the bottom of the container to said channel means, the channel means opening into the upper part of the reservoir, and means for closing the reservoir from the interior of the container except through said tube means, whereby squeezing of said side walls forces liquid upward through the tube and channel means into the reservoir.

2. The combination according to claim 1, wherein the side channel means opens into the reservoir through a downwardly directed orifice placed at a point below the rim of the reservoir for withdrawing any excess liquid over the amount below said orifice and returning it to the container when the pressure is released from the sides of the container.

NORMAN GREENE.

REFERENCES CITED

The following references are of record in the file of this patent:

UNITED STATES PATENTS

| Number | Name | Date |
| --- | --- | --- |
| 398,528 | Molin | Feb. 26, 1889 |
| 2,022,271 | Bibb | Nov. 26, 1935 |
| 2,252,119 | Edmonds | Aug. 12, 1941 |